July 21, 1959   J. E. TENNANT ET AL   2,895,464
FLUID METERING AND TIMING DEVICE
Filed Sept. 29, 1958   2 Sheets-Sheet 1

INVENTORS
RICHARD H. HAIR
JOHN E. TENNANT
BY
ATTORNEY

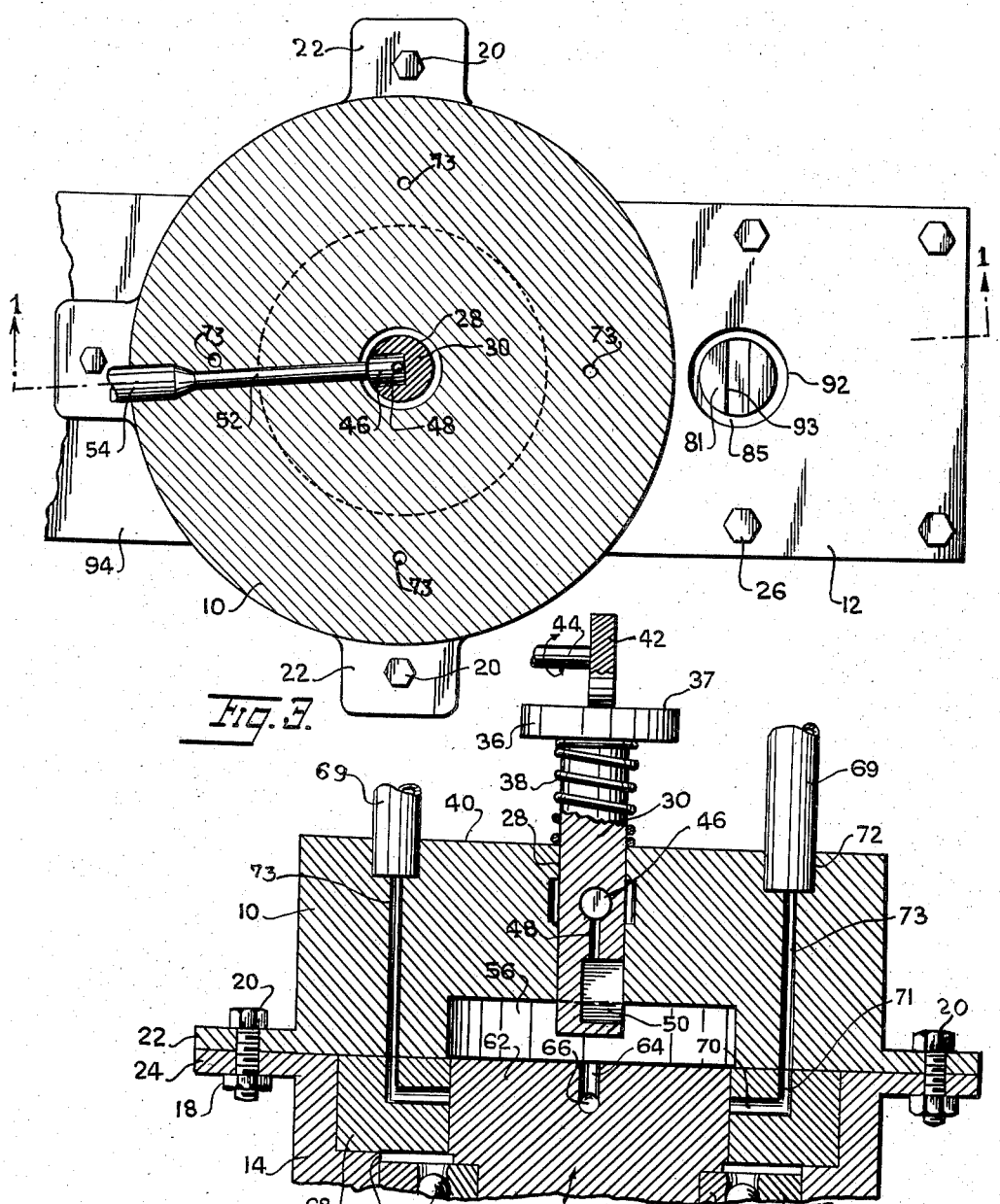

2,895,464

FLUID METERING AND TIMING DEVICE

John E. Tennant and Richard H. Hair, Rock Hill, S.C.

Application September 29, 1958, Serial No. 763,969

6 Claims. (Cl. 123—139)

This invention concerns a fluid metering and timing device.

According to the invention, fluid to be metered, timed and delivered to a consuming engine or other device enters under constant pressure at an inlet port. The fluid then enters a metering plunger. In the metering plunger there is a triangular or other tapered orifice whose opening into a chamber can be varied by raising or lowering the plunger. The metered quantity of fluid passes through the chamber into a rotating timer rotor having a distributing passage. From the rotor the fluid passes in turn to a succession of outlets. From the outlets the fluid can flow to a consuming device or other fluid receiver. The rotor may be driven by a shaft connected to an engine driven by the fuel supplied from the outlets. If the engine decreases in speed due to an increased load, the speed of the rotor will be decreased. Reduction in speed of rotation of the rotor will allow additional time for more fluid to be delivered to the outlets supplying fuel to the engine so that the speed of the engine is increased. Conversely, if the engine speed increases due to decreased load, the rotor will increase in speed and less time will be allowed for fuel to flow to each outlet in turn so that the speed of the engine will decrease. The positioning of the plunger can be controlled by a cam which changes position for each position of the rotor relative to a different outlet. This adapts the device for use in place of variable stroke pumps and the like. The device is thus adapted to vary the quantity of fluid delivered to each outlet and provide a different allotted quantity of fluid to each outlet in each cycle of the rotor.

It is therefore a principal object of the invention to provide a fluid metering device having a rotatable timer rotor including a fluid distributing passage and a plunger controlled tapered inlet to the rotor.

It is a further object to provide in a device of the character described a cam means for controlling movement of the plunger.

It is a still further object to provide a self-governing fluid metering and timing device in which a rotatable timer rotor delivers fuel to a succession of outlets in turn, the fluid outlets being connected to an engine which is operatively connected to drive the rotor.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 2 is a sectional view taken on line 2—2 of Fig. 1.

Fig. 3 is a sectional view taken on line 3—3 of Fig. 1.

Figure 1:
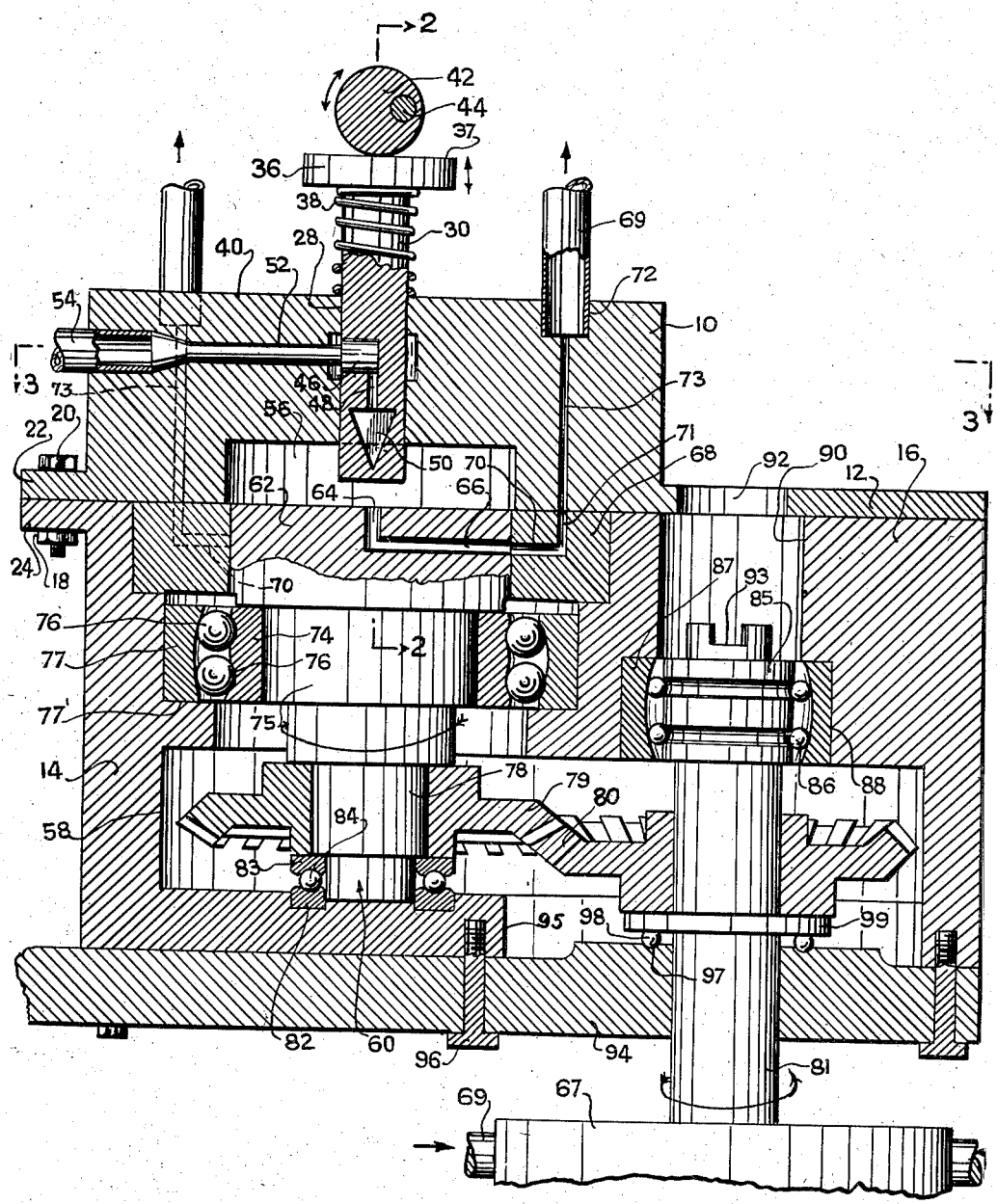
Fig. 1 is a sectional view partly in elevation of a device embodying the invention, taken on line 1—1 of Fig. 3.

Referring to the drawings, there is shown an upper cylindrical head block 10 having an outer generally rectangular flat plate extension 12. Block 10 is mounted on a cylindrical base block 14 having a rectangular extension 16 underlying the flat plate extension 12. The head 10 and base 14 are removably secured together by nuts 18 and bolts 20 anchored in lugs 22 and 24 of the head and base, respectively. Other bolts 26 are located on the plate extension and are screwed into sides of the base extension.

Head 10 has a central bore 28 in which is slidably fitted a cylindrical plunger shaft 30. The shaft 30 is lapped to the center bore 28. Fluid passage is assured to shaft 30 by an axially relieved portion or annular counterbore 32 in head 10. The shaft terminates in a top flange 36 and is biased upwardly by a coil spring 38 disposed between the flange and the upper side 40 of the head. An angularly positionable circular cam disk 42 is eccentrically mounted on a shaft 44. The disk bears on the top 37 of the plunger shaft which may cause it to reciprocate in the bore 28. The shaft 30 has a cylindrical radial bore or cavity 46 which extends inwardly and communicates with a short longitudinal passage 48. Passage 48 terminates in an orifice or opening 50 having a tapered triangular cross section and opening to one side of the shaft. This orifice may have some other tapered geometrical shape if desired. A radial bore 52 in the head communicates with bore 46. An inlet tube 54 is fitted in an enlarged outer end of bore 52. A cylindrical recess 56 is formed at the lower side of the head. This recess provides a chamber into which orifice 50 opens, as clearly shown in Fig. 2.

Base block 14 has a bore 58 in which is rotatably mounted a rotor 60. This rotor is integrally formed with a succession of cylindrical sections. The upper section 62 has a central axial bore 64 which communicates with a radial passage 66. This passage rotates with the rotor and serves to distribute fluid received from recess or chamber 56 and passing through axial bore 64. A stationary distributor ring 68 is lapped to the upper section 62 of the rotor 60. In this ring are a plurality of radially extending bores 70 which communicate with longitudinally extending passages 71 in the ring and passages 73 in the head. Each passage 73 terminates in an enlarged outlet 72 in which is fitted an outlet tube 69. These tubes 69 may terminate at an engine 67 or at any other desired receivers for the fluid delivered to the outlets. A bearing race 74 is secured to a second section 75 of the rotor. This race is engaged with ball bearings 76 disposed in an outer race ring 77 mounted on a shoulder 77' of bore 58.

On a lower section 78 of the rotor is mounted a bevel gear 79 which is continuously in mesh with another bevel gear 80 mounted on a drive shaft 81. This shaft may be driven by engine 67. The lower end of the rotor is supported by races 82, 83 between which are ball bearings 84. Shaft 81 has a grooved race 85 in which are disposed ball bearings 86 coacting with an outer race ring 87 disposed in a recess 88 in the base block extension. A bore 90 is provided in the base extension 16 which communicates with a hole 92 in the flat extension 12. The upper end of the shaft 81 is slotted at 93 for connection thereto of another shaft or power take-off from shaft 81.

A base plate 94 is secured to the underside of the base extension by bolts 96. This plate may serve as a mounting plate for the device. This plate closes an opening 95 in the base extension. The plate 94 is provided with grooves 97 in which rotate ball bearings 98. These bearings coact with a bearing ring 99 mounted on shaft 81.

In operation of the device, fluid in the form of steam, oil, a mixture of air and oil, etc., is applied under constant pressure at the inlet tube 54 and passes into cavity 46 in plunger shaft 30 through passage 52. In this plunger shaft, there is the tapered opening 50 which receives the fluid and distributes it to chamber 56. The fluid flows into passage 64, 66 of the rotor 60 which is rotated continuously by shaft 81 via the gear train 79, 80. The fluid is distributed to each passage 70 in turn as the rotor turns. From the passages 70 the fluid flows through passages 73 to outlet tubes 69. These outlet tubes can be connected to or terminate at the engine 67 as indicated in Fig. 1. The plunger shaft 30 may be held in a fixed position if it is desired to distribute the same quantity of fluid to each outlet pipe. If it is desired to vary the quantity of fluid passed to each outlet pipe, then cam 42 can be adjustably positioned by its control shaft 44 in a predetermined timed sequence or in any other manner which will raise and lower the plunger shaft to allow more or less of orifice 50 to be opened to chamber 56 for discharge of the fluid therein at a desired rate.

If the speed of the engine should increase due to decreased load, the speed of rotation of shaft 81 will increase, the rotor speed will increase, less fluid will be distributed to each outlet 69, less fluid will reach the engine, and the engine will slow down. If the engine speed decreases due to increased load, the speed of rotation of shaft 81 will decrease, the rotor speed will decrease, more fluid will be distributed to each outlet 69, more fluid will reach the engine and the engine will speed up. Thus the device operates as a self-governing fluid metering and timing device.

The present invention insures that at any given position of the plunger shaft 30, the same quantity of fluid is delivered to each outlet. The invention employs the single rotor and plunger shaft to control the distribution to all outlets instead of employing individual metering means for each outlet as in prior devices of this type.

While we have illustrated and described the preferred embodiment of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. A fluid metering and timing device, comprising a head block, a base block secured to the head block, an inlet connected to the head block for receiving fluid under pressure, a plunger mounted slidably in the head block and spring biased outwardly from the head block, means for adjustably positioning the plunger in the head block against said spring bias, a tapered orifice provided in the plunger communicating with the inlet through a passage in the head block, a generally cylindrical rotor rotatably mounted in the base block, said rotor having a radially extending passage communicating with said orifice to receive fluid therefrom, and a plurality of outlets disposed radially around said rotor to receive fluid in turn from said radially extending passage as the rotor rotates.

2. A fluid metering and timing device, comprising a head block, a base block secured to the head block, an inlet connected to the head block for receiving fluid under pressure, a plunger mounted slidably in the head block and spring biased outwardly from the head block, means for adjustably positioning the plunger in the head block against said spring bias, a tapered orifice provided in the plunger communicating with the inlet through a passage in the head block, a generally cylindrical rotor rotatably mounted in the base block, said rotor having a radially extending passage communicating with said orifice to receive fluid therefrom, and a plurality of outlets disposed radially around said rotor to receive fluid in turn from said radially extending passage as the rotor rotates, a shaft rotatably mounted in said base block, and a gear train operatively connecting the shaft and rotor for rotating the same.

3. A fluid metering and timing device, comprising a head block, a base block secured to the head block, an inlet connected to the head block for receiving fluid under pressure, a plunger mounted slidably in the head block and spring biased outwardly from the head block, means for adjustably positioning the plunger in the head block against said spring bias, a tapered orifice provided in the plunger communicating with the inlet through a passage in the head block, a generally cylindrical rotor rotatably mounted in the base block, said rotor having a radially extending passage communicating with said orifice to receive fluid therefrom, and a plurality of outlets disposed radially around said rotor to receive fluid in turn from said radially extending passage as the rotor rotates, said orifice being triangular in form and having its apical end directed toward said base block.

4. A fluid metering and timing device, comprising a head block, a base block secured to the head block, an inlet connected to the head block for receiving fluid under pressure, a plunger mounted slidably in the head block and spring biased outwardly from the head block, means for adjustably positioning the plunger in the head block against said spring bias, a tapered orifice provided in the plunger communicating with the inlet through a passage in the head block, a generally cylindrical rotor rotatably mounted in the base block, said rotor having a radially extending passage communicating with said orifice to receive fluid therefrom, and a plurality of outlets disposed radially around said rotor to receive fluid in turn from said radially extending passage as the rotor rotates, a shaft rotatably mounted in said base block, a gear train operatively connecting the shaft and rotor, and an engine connected to the shaft for rotating the shaft and rotor, said outlets being connected to said engine to provide fluid for operating the engine, whereby the speed of the engine is governed by said rotor in metering fluid to said outlets.

5. A fluid metering and timing device, comprising a head block, a base block secured to the head block, an inlet connected to the head block for receiving fluid under pressure, a plunger mounted slidably in the head block and spring biased outwardly from the head block, means for adjustably positioning the plunger in the head block against said spring bias, a tapered orifice provided in the plunger communicating with the inlet through a passage in the head block, a generally cylindrical rotor rotatably mounted in the base block, said rotor having a radially extending passage communicating with said orifice to receive fluid therefrom, and a plurality of outlets disposed radially around said rotor to receive fluid in turn from said radially extending passage as the rotor rotates, a shaft rotatably mounted in said base block, a gear train operatively connecting the shaft and rotor, and an engine connected to the shaft for rotating the shaft and rotor, said outlets being connected to said engine to provide fluid for operating the engine, whereby the speed of the engine is governed by said rotor in metering fluid to said outlets, said means comprising a cam disposed in contact with a portion of the plunger outside of the head block.

6. A fluid metering and timing device, comprising a head block, a base block secured to the head block, an inlet connected to the head block for receiving fluid under pressure, a plunger mounted slidably in the head block and spring biased outwardly from the head block, means for adjustably positioning the plunger in the head block against said spring bias, a tapered orifice provided in the plunger communicating with the inlet through a passage in the head block, a generally cylindrical rotor rotatably mounted in the base block, said rotor having a radially extending passage communicating with said orifice to receive fluid therefrom, and a plurality of outlets disposed radially around said rotor to receive fluid in turn from said radially extending passage as the rotor rotates, a shaft rotatably mounted in said base block, a gear train operatively connecting the shaft and rotor, and an engine connected to the shaft for rotating the shaft and rotor, said outlets being connected to said engine to provide fluid for operating the engine, whereby the speed of the engine is governed by said rotor in metering fluid to said outlets, said means comprising a disk cam disposed in contact with a portion of the plunger outside of the head block, and a shaft connected to said disk cam for angularly positioning the cam in selected positions.

References Cited in the file of this patent

UNITED STATES PATENTS

| | | | |
|---|---|---|---|
| 1,669,398 | Rathbun | May 8, | 1928 |
| 2,078,286 | Seagren | Apr. 27, | 1937 |
| 2,521,270 | Vanni | Sept. 5, | 1950 |
| 2,746,442 | Roosa | May 22, | 1956 |
| 2,869,526 | Dolza | Jan. 20, | 1959 |